(12) United States Patent
Seo et al.

(10) Patent No.: US 11,560,007 B2
(45) Date of Patent: Jan. 24, 2023

(54) INK-RECEIVING LAYER COMPOSITION HAVING EXCELLENT PRINTING CHARACTERISTICS FOR DECORATIVE MEMBER, DECORATIVE MEMBER, AND METHOD FOR MANUFACTURING DECORATIVE MEMBER

(71) Applicant: LG Hausys, Ltd., Seoul (KR)

(72) Inventors: Ji-Yeon Seo, Anyang-si (KR); Heon-Jo Kim, Suwon-si (KR); Sam-Hun Yun, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 17/188,373

(22) Filed: Mar. 1, 2021

(65) Prior Publication Data

US 2021/0178800 A1 Jun. 17, 2021

Related U.S. Application Data

(62) Division of application No. 16/060,832, filed as application No. PCT/KR2016/014959 on Dec. 21, 2016, now Pat. No. 10,933,678.

(30) Foreign Application Priority Data

Dec. 23, 2015 (KR) .................. 10-2015-0185405

(51) Int. Cl.
| | | |
|---|---|---|
| *B41M 5/52* | (2006.01) | |
| *B44C 1/16* | (2006.01) | |
| *B41M 7/00* | (2006.01) | |

(52) U.S. Cl.
CPC ............ *B41M 5/5227* (2013.01); *B41M 5/52* (2013.01); *B41M 5/5254* (2013.01); *B44C 1/16* (2013.01);
(Continued)

(58) Field of Classification Search
CPC ...... B41M 5/508; B41M 5/52; B41M 5/5218; B41M 5/5254; B41M 7/0027; B44C 1/16
See application file for complete search history.

(56) References Cited

U.S. PATENT DOCUMENTS

| 2001/0012556 A1 | 8/2001 | Kondo et al. |
| 2002/0136851 A1 | 9/2002 | Kollaja et al. |
(Continued)

FOREIGN PATENT DOCUMENTS

| CN | 1244022 A | 2/2000 |
| CN | 1765638 A | 5/2006 |
(Continued)

OTHER PUBLICATIONS

Machine translation of KR 101161369 B1 acquired Apr. 9, 2022.*
(Continued)

*Primary Examiner* — Gerard Higgins
(74) *Attorney, Agent, or Firm* — Hauptman Ham, LLP

(57) ABSTRACT

The present invention relates to: an ink-receiving layer composition for a decorative member, the composition comprising an acrylic emulsion, a metal salt, and organic particles or inorganic particles; a decorative member comprising a base layer, a printing layer formed on the base layer, and an ink-receiving layer disposed between the base layer and the printing layer and formed of a composition comprising an acrylic emulsion, a metal salt, and inorganic particles; and a method for manufacturing a decorative member, the method comprising a step for preparing a base layer in a flat state, a step for coating a composition comprising an acrylic emulsion, a metal salt, and organic particles or inorganic particles on the base layer, a step for drying or UV curing the coated composition to form an ink-receiving layer, and a step for forming a printing layer on the ink-receiving layer.

9 Claims, 4 Drawing Sheets

(52) U.S. Cl.
CPC ......... *B41M 5/5218* (2013.01); *B41M 7/0027* (2013.01)

(56) References Cited

U.S. PATENT DOCUMENTS

| | | |
|---|---|---|
| 2005/0003114 A1 | 1/2005 | Nakano et al. |
| 2005/0202187 A1 | 9/2005 | Sunagawa et al. |
| 2006/0088672 A1 | 4/2006 | Totani et al. |
| 2011/0003096 A1 | 1/2011 | Holbert et al. |
| 2014/0106140 A1 | 4/2014 | Ikeda et al. |
| 2014/0354742 A1 | 12/2014 | Mayo et al. |
| 2019/0054760 A1 | 2/2019 | Seo et al. |

FOREIGN PATENT DOCUMENTS

| | | |
|---|---|---|
| CN | 201249620 Y | 6/2009 |
| EP | 1571000 A2 | 9/2005 |
| EP | 1571000 A3 | 1/2006 |
| EP | 1652684 A1 | 5/2006 |
| EP | 2293949 B1 | 7/2015 |
| JP | 49-21272 B1 | 5/1974 |
| JP | 2000-309160 A | 11/2000 |
| JP | 2005-211883 A | 8/2005 |
| JP | 2005-280311 A | 10/2005 |
| JP | 2006-150942 A | 6/2006 |
| JP | 2015-51549 A | 3/2015 |
| KR | 10-2006-0043306 A | 5/2006 |
| KR | 10-2006-0049333 A | 5/2006 |
| KR | 10-2011-0041794 A | 4/2011 |
| KR | 10-1161369 B1 | 7/2012 |
| WO | 2010/114560 A1 | 10/2010 |

OTHER PUBLICATIONS

International Search Report for Application No. PCT/KR2016/014959 dated Apr. 3, 2017.
The extended European Search Report for corresponding European application No. 16879307.3 dated Nov. 9, 2018.
Japanese Office Action for corresponding Japanese Patent Application No. 2018-530749 dated May 31, 2019.
Chinese Office Action for corresponding Chinese Patent Application No. 201680072290.8 dated Aug. 5, 2020.
Ji Shibin et al., "Training Material for Civil Engineering Foremen (Technicians) Edition 2 Building Materials", Beijing: Tsinghua University Press, Apr. 30, 1995, cited in NPL No. 4 with English Translation.
U.S. Office Action dated Dec. 7, 2021, in connection with the U.S. Appl. No. 17/189,499.

* cited by examiner

INK-RECEIVING LAYER COMPOSITION HAVING EXCELLENT PRINTING CHARACTERISTICS FOR DECORATIVE MEMBER, DECORATIVE MEMBER, AND METHOD FOR MANUFACTURING DECORATIVE MEMBER

CROSS REFERENCE TO RELATED APPLICATION

This application is a Divisional application of U.S. patent application Ser. No. 16/060,832, filed on Jun. 8, 2018, which is a National Stage filing under 35 U.S.C § 371 of PCT Application No. PCT/KR2016/014959 filed on Dec. 21, 2016 which is based upon and claims the benefit of priority to Korean Patent Application No. 10-2015-0185405 filed on Dec. 23, 2015 in the Korean Intellectual Property Office. The disclosures of the above-listed applications are hereby incorporated by reference herein in their entireties.

TECHNICAL FIELD

The present invention relates to an ink composition for a decorative member, a decorative member manufactured using the ink composition, and a method for manufacturing the decorative member.

BACKGROUND ART

As interest in interior has increased recently, there is a growing demand for a decorative member with excellent design property.

Conventionally, a method for forming a printing layer so as to form a desired design on a base layer of a wallpaper or a floor material has been used to impart design property to the decorative member such as the wallpaper or the floor material.

In order to manufacture the decorative member with high design property, it is important that the printing layer is formed accurately and clearly on the base layer.

Paper is widely used as the base layer for forming the printing layer, and in general, when paper is used as the base layer, there is no great difficulty in forming the printing layer on the base layer.

However, there is a problem in that an ink forming the printing layer may not adhere well to the base layer depending on the kind of the base layer. When the ink does not adhere well to the base layer and the printing layer is not formed clearly, the design represented by the printing layer may not be accurately expressed, and thus, appearance quality of the entire decorative member may be greatly impaired.

For example, when a recording material such as photographic paper is used as the base layer, a polyolefin resin such as polyethylene, or the like, is stacked on both sides of the paper, and thus, the printing layer may not be accurately formed on the base layer, but may be spread, or may be erased by moisture, or the like.

Therefore, there is a need for a technique of forming an ink-receiving layer between the printing layer and the base layer so that the printing layer is able to be well formed on the base layer.

In addition, conventional decorative members have a problem in that harmful materials are emitted.

A representative example of the harmful material is formaldehyde. Formaldehyde has strong irritation to eyes and nasal mucosa, and is highly reactive, which may cause non-specific polymerization reactions on DNA, proteins, and lipids. The polymerization reactions may cause mutation of DNA and protein. In addition, the formaldehyde is one of causative agents of sick house syndrome and may be a cause of atopy. Excessive inhalation of formaldehyde may lead to blindness or death.

Residents may continue to be exposed to the harmful materials emitted from the decorative member when the interior material such as wallpaper is used in space where the residents stay for a long time. Thus, even if the decorative member emits a small amount of harmful materials, accumulation of the harmful materials may seriously harm health of the residents.

In order to solve the above problems, it is required to develop the decorative member that does not emit the harmful materials while helping the printing layer to be well formed on the base layer.

DISCLOSURE

Technical Problem

It is an aspect of the present invention to provide a decorative member including an ink-receiving layer having no emission of harmful materials and having greatly improved printability and durability and excellent printability.

Technical Solution

In accordance with one aspect of the present invention, an ink-receiving layer composition for a decorative member includes: an acrylic emulsion, a metal salt, and an organic particle or inorganic particle.

In accordance with another aspect of the present invention, a decorative member having no formaldehyde emission includes: a base layer; a printing layer formed on the base layer; and an ink-receiving layer disposed between the base layer and the printing layer and formed of a composition including an acrylic emulsion, a metal salt, and an organic particle or inorganic particle.

In accordance with still another aspect of the present invention, a method for manufacturing a decorative member includes: preparing a base layer in a flat state, applying a composition including an acrylic emulsion, a metal salt, and an organic particle or inorganic particle on the base layer, drying or UV curing the applied composition, thereby forming an ink-receiving layer, and forming a printing layer on the ink-receiving layer.

Advantageous Effects

The ink-receiving layer composition for a decorative member according to the present invention and the decorative member may have high printability and improved durability without emission of harmful materials.

According to the method for manufacturing a decorative member of the present invention, the printability may be increased by uniformly applying the ink-receiving layer on the base layer, and the product quality may be improved since no foreign materials are mixed in the process for manufacturing a decorative member.

BEST MODE

Figure 1:
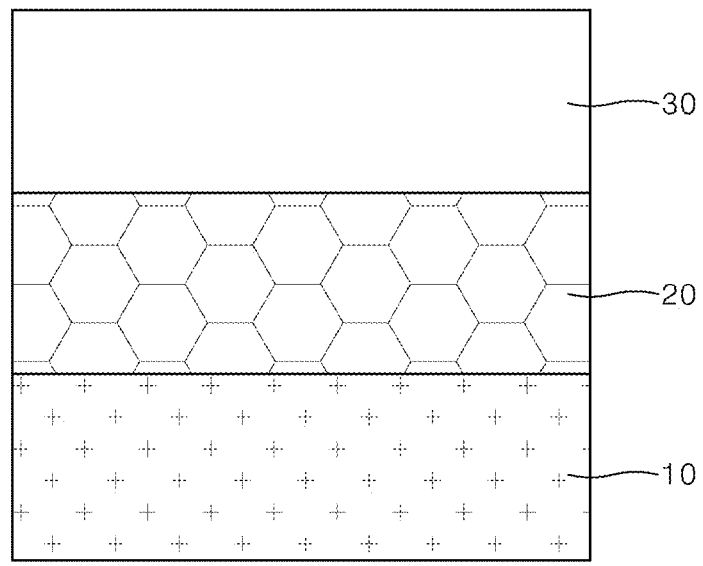
FIG. 1 is a cross-sectional view of a decorative member according to an exemplary embodiment of the present invention.

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals refer to like components throughout the specification.

Ink-Receiving Layer Composition for Decorative Member

Hereinafter, an ink-receiving layer composition for a decorative member according to the present invention is described in detail. The ink-receiving layer composition for a decorative member according to an exemplary embodiment of the present invention may include an acrylic emulsion, a metal salt, and an organic particle or inorganic particle.

The ink-receiving layer composition for a decorative member according to the present invention includes 5 to 20 parts by weight of the metal salt and 10 to 30 parts by weight of the organic particle or inorganic particle based on 100 parts by weight of the acrylic emulsion.

When the metal salt is included in an amount of less than 5 parts by weight based on 100 parts by weight of the acrylic emulsion, dissolution of the acrylic emulsion in the ink-receiving layer composition for a decorative member may not be sufficiently secured since the number of cations and anions manufactured by dissociation of the metal salt is small. In addition, when the metal salt is included in an amount of more than 20 parts by weight, the concentration of the acrylic emulsion in the ink-receiving layer composition for a decorative member may be lowered, and thus, sufficient printability may not be secured.

When the organic particle or the inorganic particle is included in an amount of less than 10 parts by weight based on 100 parts by weight of the acrylic emulsion, there is a problem in that the ink-receiving layer composition for a decorative member has low durability and drying property of the ink is lowered. In addition, when the organic particle or the inorganic particle is included in an amount of more than 30 parts by weight, there may be a problem in that blurring of the ink may occur, and thus, the printability may be lowered, and viscosity of the ink-receiving layer composition for a decorative member may be excessively large, and thus, it is difficult to apply the ink-receiving layer composition for a decorative member on the base layer.

A preferred viscosity of the ink-receiving layer composition for a decorative member according to the present invention is 20 cP to 600 cP at 25° C. When the viscosity of the ink-receiving layer composition for a decorative member is less than 20 cP or more than 600 cP, it is difficult to apply the ink-receiving layer composition for a decorative member on the base layer.

Hereinafter, each component included in the ink-receiving layer composition for a decorative member of the present invention is described in detail.

Acrylic Emulsion

First, the acrylic emulsion serves as a binder in the ink-receiving layer composition for a decorative member according to the present invention. The acrylic emulsion may be anionic or cationic.

Since the acrylic emulsion is used as the binder of the ink-receiving layer composition for a decorative member, there is no formaldehyde emission.

Non-limiting examples of a monomer used in the acrylic emulsion include methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, hexyl methacrylate, isopropyl methacrylate, butyl methacrylate, hexyl methacrylate, octyl methacrylate, styrene, acrylic acid, methacrylic acid, glycidyl acrylate, glycidyl methacrylate, hydroxyethyl acrylate, hydroxyethyl methacrylate, hydroxylpropyl acrylate, hydroxypropyl methacrylate, etc.

The acrylic emulsion is prepared by mixing a resin and/or a plasticizer with one or two or more monomers.

The plasticizer may be a phthalate-based or non-phthalate-based plasticizer.

The resin may be an acrylic polymer or a cellulose-based polymer.

The acrylic emulsion may further include a surfactant, an emulsifier, a preservative, and a buffer. The emulsifier may be non-ionic, anionic, cationic or zwitterionic, and preferably has good spreadability in the range from 30 to 35 dynes/cm. The preservative prevents fungi or bacteria from changing physical properties of the emulsion. The buffer stabilizes pH during a polymerization reaction if the polymerization of the emulsion is performed in an acidic environment The acrylic emulsion may be preferably prepared by emulsion polymerization, but a preparation method thereof is not particularly limited. When the acrylic emulsion is prepared by emulsion polymerization, yield is good and a molecular weight distribution (Mw/Mn) of the resulting acrylic emulsion is in a relatively small range from 2.0 to 4.84.

Metal Salt

Next, the metal salt included in the ink-receiving layer composition for a decorative member according to the present invention is described.

The metal salt is dissociated into cations and anions in the ink-receiving layer composition for a decorative member to thereby assist the cationic or anionic acrylic emulsion to be capable of being easily dissolved in the ink-receiving layer composition for a decorative member.

Accordingly, the metal salt may increase printability of the decorative member formed by using the ink-receiving layer composition for a decorative member.

The metal salt may be at least one selected from the group consisting of nitrate of Zn, Cu, Fe, Mn, Li, Ag, Mg, and Ca, sulfate of Zn, Cu, Fe, Mn, Li, Ag, Mg, and Ca, chloride salt of Zn, Cu, Fe, Mn, Li, Ag, Mg, and Ca, and a combination thereof.

Organic Particle

In the ink-receiving layer composition for a decorative member according to the present invention, the organic particle increases the durability of the ink-receiving layer.

Inorganic Particle

In the ink-receiving layer composition for a decorative member according to the present invention, the inorganic particle increases the durability of the ink-receiving layer, which is the same as the organic particle.

The kind of the inorganic particle is not particularly limited, but may be preferably at least one selected from the group consisting of kaoline, silica, alumina, Calcium Carbonate, $TiO_2$, $Ca(OH)_2$, CaO, $Al(OH)_3$, $Al_2O_3$, and a combination thereof.

Decorative Member 100

Hereinafter, a decorative member 100 according to the present invention is described in detail. Referring to FIG. 1, the decorative member 100 according to an exemplary embodiment of the present invention may include a base layer 10; a printing layer 30 formed on the base layer; and an ink-receiving layer 20 disposed between the base layer and the printing layer and formed of a composition including an acrylic emulsion, a metal salt, and an organic particle or inorganic particle, wherein there is no formaldehyde emission.

Hereinafter, each configuration included in the decorative member of the present invention is described in detail.

Base Layer (10)

Referring to FIG. 1, the base layer 10 included in the decorative member 100 according to the present invention, which is a basic layer of the decorative member 100, may support the ink-receiving layer 20, the printing layer 30, etc., at an upper part, and may absorb impact of the upper and lower parts.

In addition, the base layer 10 may have a thickness of about 0.1 μm to about 100 μm, but the thickness is not limited thereto.

A material that is usable for the base layer 10 includes, but is not limited to, at least any one of PVC, PET, paper, woody board, inorganic board, and synthetic resin board.

A surface of the base layer 10 may be in any form, but it is preferably flat for the uniform application of the ink-receiving layer 20 and the printing layer 30 on the base layer 10.

Printing Layer 30

Referring to FIG. 1, the printing layer 30 included in the decorative member 100 according to the present invention may be formed by imparting patterns in various manners such as gravure printing, screen printing, offset printing, rotary printing, flexo printing, etc.

The ink used for forming the printing layer 30 is not particularly limited, and may be a general ink in the art.

The printing layer 30 may have a thickness of 0.1 to 5 mm, but the thickness is not limited thereto.

Ink-Receiving Layer 20

Referring to FIG. 1, the ink-receiving layer 20 included in the decorative member according to the present invention may have no emission of harmful materials, in particular, formaldehyde, and may maximize the printability and increase the durability of the decorative member.

The ink-receiving layer 20 is positioned between the base layer 10 and the printing layer 30 to assist in forming the printing layer 30 on the base layer 10.

Specifically, the acrylic emulsion in the ink-receiving layer 20 performs a binder function of binding the base layer 10 and the printing layer 30, and thus, the printing layer 30 may be formed well on the base layer 10 regardless of the type of the base layer 10.

The ink-receiving layer 20 may be formed of a composition including an acrylic emulsion, a metal salt, and an organic particle or inorganic particle. The details of the acrylic emulsion, metal salt and organic particle or inorganic particle included in the ink-receiving layer 20 are the same as described above.

In addition, as described above, the ink-receiving layer 20 may be formed of a composition in which a viscosity at 25° C. is 20 cP to 600 cP, and may be formed of a composition including 5 to 20 parts by weight of the metal salt and 10 to 30 parts by weight of the organic particle or inorganic particle based on 100 parts by weight of the acrylic emulsion.

The ink-receiving layer has a preferable thickness range from 2 to 5 microns. When the thickness of the ink-receiving layer 20 is less than 2 microns, the amount of the acrylic emulsion included in the ink-receiving layer may be insufficient, and thus, the binding of the printing layer 30 and the base layer 10 may not be achieved. In addition, when the thickness of the ink-receiving layer 20 is more than 5 microns, since the ink-receiving layer 20 is excessively thick, a distance between the printing layer 30 and the base layer 10 is excessively long, and thus, the binding of the printing layer 30 on the base layer 10 may not be achieved.

Transparent Layer 40

Figure 2:
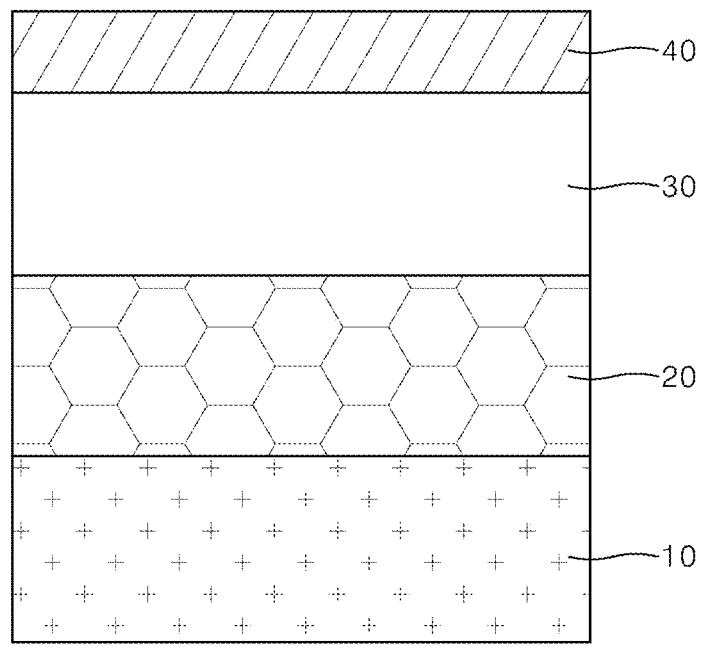
FIG. 2 is a cross-sectional view of a decorative member according to another exemplary embodiment of the present invention.

Referring to FIG. 2, the decorative member 100 according to the present invention may further include a transparent layer 40 on the printing layer 30. The transparent layer 40 may be formed at the uppermost part in order to enhance surface quality such as scratch resistance, abrasion resistance, or the like, and to improve stain resistance of the decorative member 100.

A thickness of the transparent layer 40 is preferably 0.5 mm to 5 mm. When the thickness of the transparent layer 40 is less than 0.5 mm, improvement of the scratch resistance, abrasion resistance, or the stain resistance of the decorative member 100 may not be achieved. In addition, when the thickness of the transparent layer 40 is more than 5 mm, reflection or refraction of the visible light by the transparent layer 40 may reduce appearance of the pattern to be expressed by the printing layer.

The transparent layer 40 may be formed of a composition including at least one selected from the group consisting of a polyethylene terephthalate (PET) film, a polybutylene terephthalate (PBT) film, a polycarbonate film, an ethylene vinyl acetate (EVA) film, a polyethylene film, a polypropylene film, and a combination thereof.

Method for Manufacturing Decorative Member

Hereinafter, a method for manufacturing a decorative member according to the present invention is described in detail.

Figure 4:
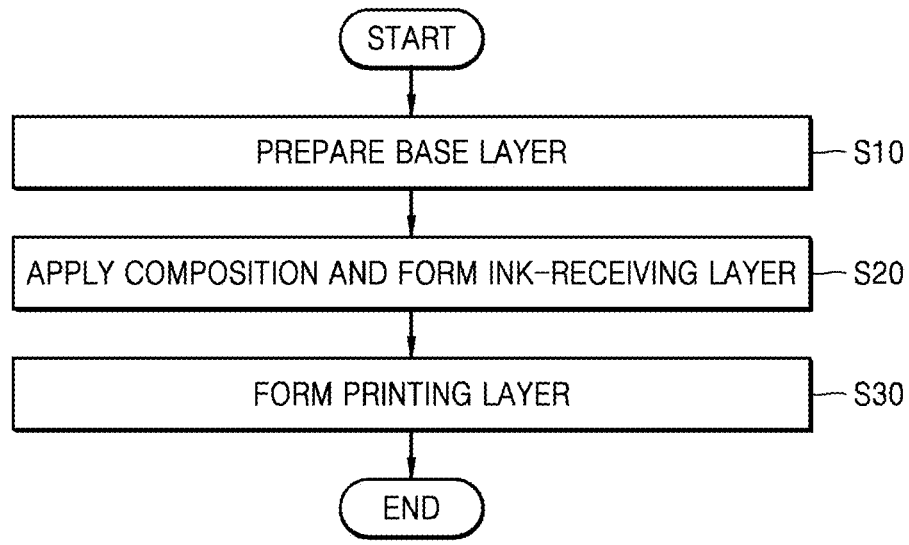
FIG. 4 is a flowchart showing a method for manufacturing a decorative member according to the present invention.
Figure 5:
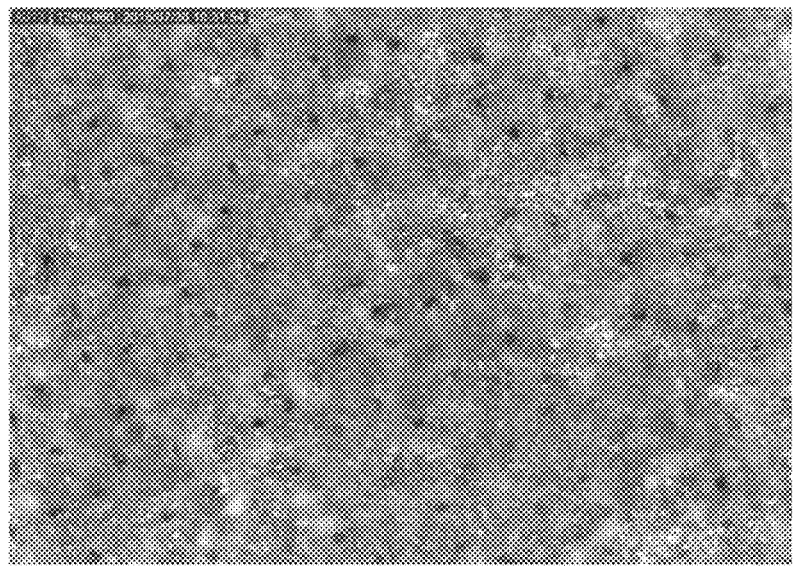
FIG. 5 shows test results of printability of the decorative member according to an exemplary embodiment of the present invention.
Figure 6:
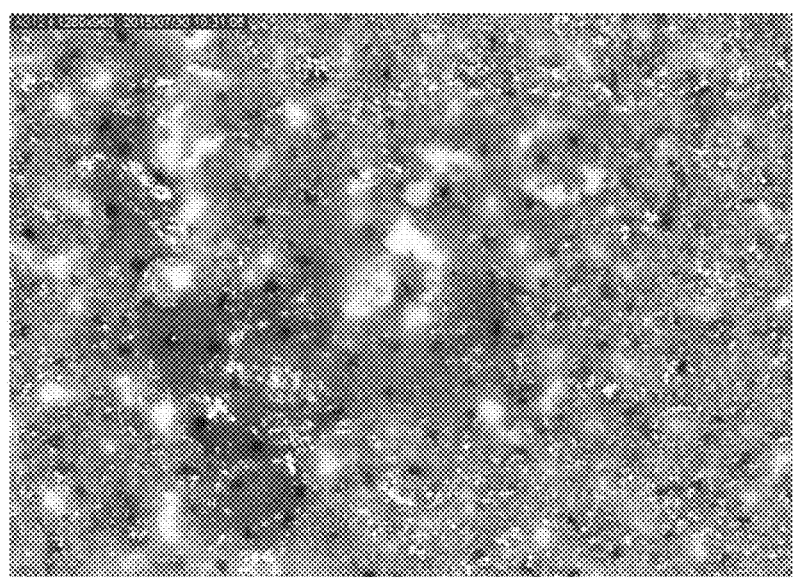
FIG. 6 shows test results of printability of the decorative member according to Comparative Example of the present invention.

Referring to FIG. 4, the method for manufacturing a decorative member according to an exemplary embodiment of the present invention includes: preparing a base layer in a flat state S10, applying a composition including an acrylic emulsion, a metal salt, and an organic particle or inorganic particle on the base layer, drying or UV curing the applied composition, thereby forming an ink-receiving layer S20, and forming a printing layer on the ink-receiving layer S30.

Figure 3:
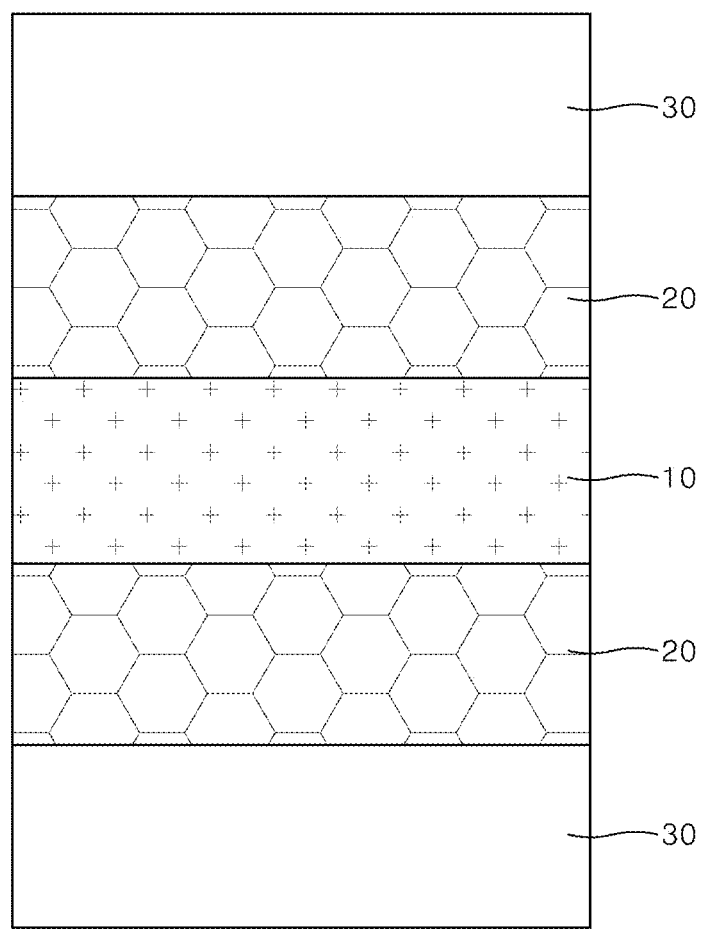
FIG. 3 is a cross-sectional view of a decorative member according to still another exemplary embodiment of the present invention.

According to an exemplary embodiment of the present invention, the ink-receiving layer and the printing layer are formed on one side of the base layer in order. However, as shown in FIG. 3, the ink-receiving layer and the printing layer may be formed on both sides of the base layer, if necessary. When the decorative member is not attached to a wall or a floor, the ink-receiving layer and the printing layer may be required to be formed on both sides of the base layer.

Step of Preparing Base Layer S10

The base layer 10 is preferably flat in order to uniformly apply the ink-receiving layer composition on the base layer 10. The uniform application of the ink-receiving layer 20 helps the printing layer 30 to be precisely formed, thereby expressing desired patterns.

Step of Applying Composition and Forming Ink-Receiving Layer S20

Details of the acrylic emulsion, the metal salt, and the organic particle or the inorganic particle included in the composition applied on the base layer 10 are as described above.

As a method for applying the composition on the base layer 10, a roll coating method may be used, but the present invention is not limited thereto.

The composition applied on the base layer 10 is dried to form the ink-receiving layer 20. The composition is preferably dried in a temperature range from 80° C. to 200° C. The drying may not be sufficiently performed at a temperature lower than 80° C., and the base layer 10 formed of a material such as paper, PET, or the like, may be deformed at a temperature higher than 200° C.

Step of Forming Printing Layer S30

The printing layer 30 is formed on the ink-receiving layer 20. The printing layer 30 may be formed by at least one method selected from the group consisting of gravure printing, screen printing, offset printing, rotary printing or flexo printing and a combination thereof, using a water-based ink.

Step of Forming Printing Layer

In an exemplary embodiment of the present invention, the transparent layer 40 may be further formed on the printing layer 30. The transparent layer 40 has an effect of enhancing surface quality such as scratch resistance, abrasion resistance, or the like, and improving stain resistance of the decorative member 100.

The transparent layer 40 is formed on the printing layer 30 by thermal lamination. The thermal lamination is preferably performed in a temperature range from 100° C. to 200° C. When the thermal lamination is performed at a temperature lower than 100° C., the temperature is lower than a glass transition temperature (Tg) of a material forming the transparent layer 40, and thus, the transparent layer 40 may not adhere well on the printing layer 30. Further, when the thermal lamination is performed at a temperature higher than 200° C., the base layer 10 may be deformed.

Hereinafter, specific examples of the present invention will be provided. It is to be noted that Examples to be described below are provided merely for specifically exemplifying or explaining the present invention, and accordingly, the present invention is not limited to the following Examples.

EXAMPLE

1. Preparation of Ink-Receiving Layer Composition for Decorative Member

The acrylic emulsion used for preparing the ink-receiving layer composition for a decorative member in each of Examples and Comparative Examples was prepared by polymerizing a mixture including butyl acrylate, methyl methacrylate, hydroxyethyl acrylate, a phthalate-based plasticizer and an emulsifier (BriteCoat 2730 (VAE emulsion)) through emulsion polymerization. Further, in order to prepare the ink-receiving layer composition for a decorative member, $MgCl_2$, $CaCl_2$ or $ZnCl_2$ metal salt was used and silica, Calcium Carbonate or kaolin was used as an inorganic particle.

The ink-receiving layer composition for a decorative member was prepared by stirring the above-described acrylic emulsion, metal salt, organic particle or inorganic particle in an environment of 100° C.

Amounts of the acrylic emulsion, the metal salt, the organic particle or the inorganic particle in Examples and Comparative Examples are shown in Table 1 below.

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Acrylic emulsion | Acrylic emulsion | 100 | 100 | 100 | 100 | 100 | 100 | 100 | 100 | 100 | 100 |
| Metal salt | $MgCl_2$ | 20 | | | 20 | | | 20 | | | |
| | $CaCl_2$ | | 20 | | | 20 | | | | | |
| | $ZnCl_2$ | | | 20 | | | 20 | | | | |
| Inorganic particle | Silica | 30 | 30 | 30 | | | | | | 30 | |
| | Kaoline | | | | 30 | 30 | 30 | | | | 30 |
| Inorganic particle | Calcium carbonate | | | | | | | 30 | | | |

2. Manufacture of Decorative Member (1) Manufacture of Decorative Members According to Examples The ink-receiving layer compositions for a decorative member according to the above Examples and Comparative Examples were applied to a flat PVC base layer having a thickness of 2.0 mm so as to have a thickness of 3 microns by a roll coating method.

Each ink-receiving layer composition for a decorative member applied to the base layer was dried in a 120° C. Mathis oven (manufactured by MATHIS AG).

On the ink-receiving layer composition formed by drying the ink-receiving layer composition for a decorative member, a printing layer was formed by a screen printing method.

(2) Manufacture of Decorative Member According to Comparative Examples

1) Comparative Example 1

Comparative Example 1 was performed in the same manner as in Example 1 except that the decorative member was manufactured by including the ink-receiving layer formed of the ink-receiving layer composition without including the metal salt and the inorganic particle.

2) Comparative Example 2

Comparative Example 2 was performed in the same manner as in Example 1 except that the decorative member was manufactured by including the ink-receiving layer formed of the ink-receiving layer composition without including the metal salt.

3) Comparative Example 3

Comparative Example 3 was performed in the same manner as in Example 4 except that the decorative member was manufactured by including the ink-receiving layer formed of the ink-receiving layer composition without including the metal salt.

3. Evaluation of Decorative Member

The printability and durability of the decorative members of Examples and Comparative Examples were evaluated. The durability was evaluated by three divided physical properties: drying property, processability, and viscosity suitability.

The drying property was evaluated by drying the decorative member applied with the ink for 3 seconds in a 160° C. Mathis oven (manufactured by MATHIS AG), and confirming whether the drying was completed. A case where the drying was completed was marked by O, and a case where the drying was not completed was marked by X.

The processability was evaluated by visually confirming whether the ink was uniformly applied to the base material, that is, uniformity of application. A case where the ink was uniformly applied to the entire region of the decorative member was marked by O, a case where the application was not uniformly performed to some region of the decorative member but there was no effect on marketability was marked by Δ, and a case where the application was not uniformly performed and the marketability was impaired was marked by X.

In the case of the viscosity suitability, a case where a viscosity at 25° C. of the ink-receiving layer composition was 20 cP to 600 cP was marked by O, a case where the viscosity was more than 600 cP to 700 cP or less was marked by Δ, and a case where the viscosity was more than 700 cP was marked by X.

The printability was confirmed by photographing whether the ink was fixed at the place where the ink was applied on the decorative member or the ink flowed down after being applied, using an optical microscope. A case where there was no flowing ink and all the ink was fixed on the decorative member was marked by ⊚, a case where the ink was applied in a region of 98% or more to less than 100% was marked by O, a case where the ink was fixed in the region of 95% or more to less than 98% was marked by Δ, and a case where the ink was fixed in the region of less than 95% was marked by X.

Evaluation results of physical properties of the Examples and Comparative Examples are shown in Table 2 below:

TABLE 2

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Drying property | O | O | O | O | O | O | O | X | O | O |
| Processability | O | O | O | Δ | Δ | Δ | Δ | X | X | X |
| Viscosity suitability | O | O | O | O | O | O | O | O | X | Δ |
| Printability | O | ⊚ | O | O | ⊚ | O | O | X | X | X |

In the drying property, Examples 1 to 7 were all excellent. That is, the decorative members of Examples 1 to 7 were completely dried when they were dried for 3 seconds in a 160° C. Mathis oven (manufactured by MATHIS AG). The drying property is an important physical property in a continuous process. When three seconds or more are required to dry the ink, a process after the drying may be delayed, and thus efficiency of the entire process may be reduced. In Comparative Example 1 having poor drying property, the ink-receiving layer composition formed only of the acrylic emulsion was not dried easily, and the ink stained on the hand even after the drying process.

Examples 1 to 3 showed excellent processability and Examples 4 to 7 showed insufficient processability as compared to those of Examples 1 to 3. In Comparative Examples, it could be confirmed that the processability was remarkably insufficient. The processability is to confirm whether the ink was uniformly applied to the base material, and is an element directly related to the appearance quality of the product. In Comparative Examples 1 to 3 in which the metal salt was not included, the acrylic emulsion did not dissolve well in the ink-receiving layer composition, resulting in non-uniform application of the ink.

The viscosity suitability is to confirm whether the viscosity of the composition is within the desired viscosity range from 20 to 600 cP. The viscosity of the composition is related to the ease of application of the composition. That is, when the viscosity is higher than 600 cP, it may be difficult to apply the composition onto the base material. All of the compositions of the Examples according to the present invention were excellent in viscosity suitability.

The printability is to confirm whether the ink is fixed to the place where the ink was applied on the base material. When the ink was not fixed at the place where the ink was applied but flowed down, the appearance of the product was impaired and it was difficult to print a desired pattern. FIGS.

5 and 6 are images of the decorative member having excellent printability and the decorative member having poor printability, respectively, taken by the optical microscope. It could be confirmed that in the decorative member having excellent printability, the pink ink was well fixed on the base material and uniformly distributed. On the other hand, it could be confirmed that in the decorative member having poor printability, the pink ink was not fixed on the base material but flowed down, and thus, the ink was not applied in some region. The compositions of the Examples according to the present invention had excellent printability, but the compositions of the Comparative Examples did not have excellent printability.

The invention claimed is:

1. A method for manufacturing a decorative member comprising:
   preparing a base layer, wherein the base layer comprises PVC,
   applying a composition including an acrylic emulsion, a metal salt, and an inorganic particle on the base layer, drying or UV curing the applied composition, thereby forming an ink-receiving layer, and
   forming a printing layer on the ink-receiving layer,
   wherein in the composition, an amount of the metal salt is 5 to 20 parts by weight based on 100 parts by weight of the acrylic emulsion, and an amount of the inorganic particle is 10 to 30 parts by weight based on 100 parts by weight of the acrylic emulsion, and a thickness of the ink-receiving layer ranges from 2 to 5 microns.

2. The method of claim 1, wherein the drying of the composition is performed in a temperature range from 80° C. to 200° C.

3. The method of claim 1, wherein the forming of the printing layer is performed according to at least one method selected from the group consisting of transfer printing, gravure printing, screen printing, offset printing, rotary printing or flexo printing and a combination thereof, using a water-based ink.

4. The method of claim 1, wherein a transparent layer is further formed on the printing layer.

5. The method of claim 4, wherein the transparent layer is formed on the printing layer by thermal lamination.

6. The method of claim 5, wherein the thermal lamination is performed in a temperature range from 100° C. to 200° C.

7. The method of claim 1, wherein a viscosity of the composition at 25° C. is 20 cP to 600 cP.

8. The method of claim 1, wherein the metal salt is at least one selected from the group consisting of nitrate of Zn, Cu, Fe, Mn, Li, Ag, Mg, and Ca, sulfate of Zn, Cu, Fe, Mn, Li, Ag, Mg, and Ca, chloride salt of Zn, Cu, Fe, Mn, Li, Ag, Mg, and Ca, and a combination thereof.

9. The method of claim 1, wherein the inorganic particle is at least one selected from the group consisting of kaoline, silica, alumina, $TiO_2$, $Ca(OH)_2$, CaO, $Al(OH)_3$, calcium carbonate and a combination thereof.

* * * * *